(12) United States Patent
Bastian, II et al.

(10) Patent No.: US 8,397,897 B2
(45) Date of Patent: Mar. 19, 2013

(54) VERTICAL SPIRAL MULTILEVEL SORTER AND MERGE CONVEYOR FOR THREE DIMENSIONAL AUTOMATED PICK MODULE

(75) Inventors: William A. Bastian, II, Carmel, IN (US); Elizabeth Sobota, Greenfield, IN (US)

(73) Assignee: Bastian Solutions, LLC, Indianapolis, IN (US)

( * ) Notice: Subject to any disclaimer, the term of this patent is extended or adjusted under 35 U.S.C. 154(b) by 271 days.

(21) Appl. No.: 12/830,099

(22) Filed: Jul. 2, 2010

(65) Prior Publication Data

US 2010/0300842 A1 Dec. 2, 2010

Related U.S. Application Data

(63) Continuation of application No. PCT/US2009/030118, filed on Jan. 5, 2009, which is a continuation-in-part of application No. 11/626,869, filed on Jan. 25, 2007, now Pat. No. 8,276,739, which is a continuation-in-part of application No.

(Continued)

(51) Int. Cl.
*B65G 1/137* (2006.01)
(52) U.S. Cl. .................. 198/347.1; 414/277; 414/267; 414/807; 901/30
(58) Field of Classification Search .................. None
See application file for complete search history.

(56) References Cited

U.S. PATENT DOCUMENTS

| 2,873,033 | A | | 2/1959 | Mapstone |
| 3,687,312 | A | | 8/1972 | Weir |
| 4,026,409 | A | * | 5/1977 | Stockdale ............. 198/774.3 |
| 4,159,696 | A | | 7/1979 | Marlin |
| 4,212,385 | A | | 7/1980 | Leach |

(Continued)

FOREIGN PATENT DOCUMENTS

| DE | 39 41 754 A1 | 6/1991 |
| DE | 40 31 883 A1 | 4/1992 |

(Continued)

OTHER PUBLICATIONS

International Patent Application No. PCT/US2011/026570 International Search Report and Written Opinion mailed Nov. 7, 2011.

(Continued)

*Primary Examiner* — Kavel Singh
(74) *Attorney, Agent, or Firm* — Woodard, Emhardt, Moriarty, McNett & Henry LLP

(57) ABSTRACT

A vertical storage rack system includes a vertically moveable transport conveyor and one or more vertical feed conveyors that vertically extend between the various rack levels so that items can be loaded and/or unloaded at any of the levels without the need for the vertically moveable transport to return to a loading/unloading level. This vertical rack system can be used to load and unload items from the racks as well as rearrange items in the racks. This system and technique allows items to be continuously moved in a vertical direction as well as sorts or merges the items at high speeds. In other words, this arrangement minimizes the vertical positioning of the vertically moveable transport conveyor, such as a crossbelt conveyor, before it can discharge (and/or load) items, thereby improving throughput.

37 Claims, 9 Drawing Sheets

Related U.S. Application Data

PCT/US2008/050501, filed on Jan. 8, 2008, which is a continuation of application No. 11/626,869, application No. 12/830,099, which is a continuation-in-part of application No. 11/626,869.

(60) Provisional application No. 61/021,992, filed on Jan. 18, 2008.

(56) References Cited

U.S. PATENT DOCUMENTS

| | | | |
|---|---|---|---|
| 4,236,862 A | | 12/1980 | McCormick |
| 4,265,582 A | | 5/1981 | Theobald |
| 4,641,271 A | | 2/1987 | Konishi et al. |
| 4,720,228 A | | 1/1988 | Horiguchi et al. |
| 5,135,344 A | * | 8/1992 | Kita et al. .................. 414/273 |
| 5,174,707 A | | 12/1992 | Suekane et al. |
| 5,178,506 A | | 1/1993 | Meschi |
| 5,203,671 A | | 4/1993 | Cawley et al. |
| 5,226,782 A | | 7/1993 | Rigling |
| 5,328,316 A | | 7/1994 | Hoffmann |
| 5,336,042 A | | 8/1994 | Winski |
| 5,348,440 A | | 9/1994 | Focke |
| 5,478,183 A | | 12/1995 | Savigny |
| 5,564,890 A | | 10/1996 | Knudsen, Jr. |
| 5,582,497 A | | 12/1996 | Noguchi |
| 5,733,098 A | | 3/1998 | Lyon et al. |
| 5,826,699 A | | 10/1998 | Trauten |
| 5,863,172 A | | 1/1999 | Pearson et al. |
| 5,953,234 A | | 9/1999 | Singer et al. |
| 5,955,857 A | | 9/1999 | Kwon et al. |
| 6,061,607 A | | 5/2000 | Bradley et al. |
| 6,149,366 A | | 11/2000 | Deandrea |
| 6,377,867 B1 | | 4/2002 | Bradley et al. |
| 6,425,226 B1 | | 7/2002 | Kirschner |
| 6,695,569 B2 | | 2/2004 | Hofer |
| 6,715,598 B2 | * | 4/2004 | Affaticati et al. ............ 198/357 |
| 6,824,345 B2 | | 11/2004 | Hansl et al. |
| 6,929,440 B1 | | 8/2005 | Grond |
| 7,266,422 B1 | | 9/2007 | DeMotte et al. |
| 2006/0237285 A1 | * | 10/2006 | DeSanto .................. 198/361 |
| 2008/0046116 A1 | | 2/2008 | Khan et al. |
| 2008/0181753 A1 | | 7/2008 | Bastian et al. |

FOREIGN PATENT DOCUMENTS

| | | |
|---|---|---|
| DE | 198 48 274 A1 | 5/2000 |
| JP | H06-115632 A | 4/1994 |
| JP | H08-113314 A | 5/1996 |
| KR | 10-0666966 B1 | 1/2007 |
| WO | WO 2008/091733 A2 | 7/2008 |
| WO | WO 2009/089159 A2 | 7/2009 |

OTHER PUBLICATIONS

U.S. Appl. No. 11/626,869 to Bastian et al., Office Action mailed Mar. 23, 2011.

International Patent Application No. PCT/US2008/50501 International Search Report and Written Opinion mailed Sep. 2, 2008.

International Patent Application No. PCT/US2009/030118 International Search Report and Written Opinion mailed Aug. 18, 2009.

Power Automation Systems—High Speed Layer Picking & Building [retrieved Mar. 24, 2010]. Retrieved from the Internet: <URL: http://www.pas-us/com/video%20whitepaper/powerbuild/index.htm>.

Power Automation Systems—PASNews [retrieved Sep. 2, 2009]. Retrieved from the Internet: <URL: http://www.pas-us.com/news.html>.

Power Automation Systems—PowerBuild Case Study, Leche Pascual Group, May 2009.

Power Automation Systems—PowerBuild High Speed Mixed-Palletizing [retrieved 09/02/2009]. Retrieved from the Internet: URL: http://www.pas-us.com/powerBuild.html>.

Adept Cobra s800 Inverted, Adept Technology, Inc., http://www.adept.com/products/details.asp [Retrieved from the Internet Jan. 24, 2007].

Automated Storage and Retrieval Machines, HK Systems, Inc., http://www.hksystems.com/automated-storage-and-retrieval/index.cfm [Retrieved from the Internet Jan. 24, 2007].

CIC/MHE Material Handling Equipment, MHE Taxonomy, http://www.ise.ncsu.edu/kay/mhetax/TransEq/Conv/index.html [Retrieved from the Internet Jan. 24, 2007].

Cross-Belt Sorter, GBI Data and Sorting Systems, http://www.gbisorters.com/cross-belt.vgm [Retrieved from the Internet Jan. 24, 2007].

Industrial robot, Wikipedia, http://en.wikipedia.org/wiki/Industrial_robot [Retrieved from the Internet Jan. 24, 2007].

Innovation You Can Handle, SSI Schaefer, http://www.ssi-schaefer.ca/ASRS [Retrieved from the Internet Jan. 24, 2007].

Mail Sorter, GBI Data and Sorting Systems, http://www.gbisorters.com/mail-sorter.cfm [Retrieved from the Internet Jan. 24, 2007].

Mini Load Automated Buffer, Daifuku Co., Ltd., http://www.daifukuamerica.com/daifuku/dac/fada/f_mlab_1.asp [Retrieved from the Internet Jan. 24, 2007.].

TGW Ermanco—The Premier Material Handling Technology Source: Innovation. Expertise. Services, TGW Ermanco, Product Brochure [Retrieved from the Internet Jan. 24, 2007].

DE 198 48 274 A1 to Siemens AG—Machine Translation.

DE 39 41 754 A1 to Fraunhofer Ges Forschung—Machine Translation.

DE 40 31 883 A1 to Koellgen Gmbh & Co. KG—Machine Translation.

EP 08 71 3646 European Search Report Jan. 20, 2011.

* cited by examiner

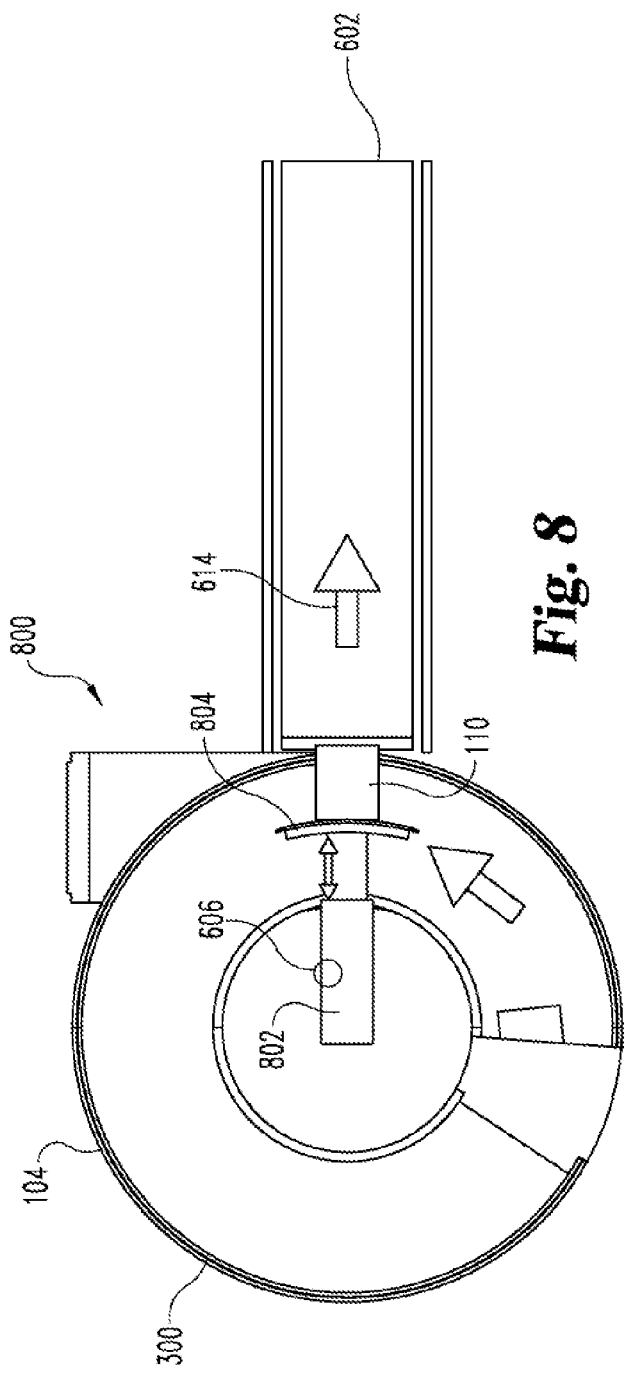
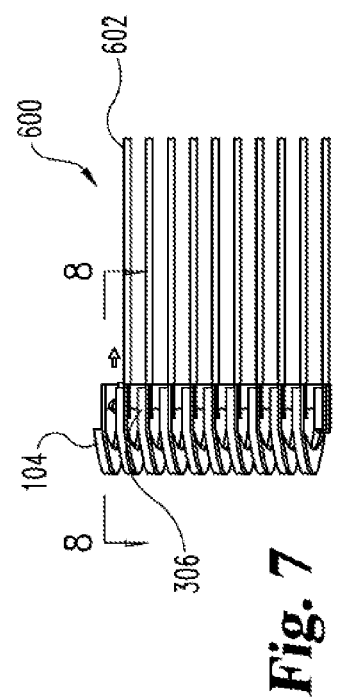
Fig. 8
Fig. 7

VERTICAL SPIRAL MULTILEVEL SORTER AND MERGE CONVEYOR FOR THREE DIMENSIONAL AUTOMATED PICK MODULE

REFERENCE TO RELATED APPLICATIONS

This application is a continuation of International Application No. PCT/US2009/030118 filed Jan. 5, 2009, which claims the benefit of U.S. Provisional Application No. 61/021,992, filed Jan. 18, 2008, which are hereby incorporated by reference in their entirety. International Application No. PCT/US2009/030118, filed Jan. 5, 2009, is also a continuation-in-part of U.S. patent application Ser. No. 11/626,869, filed Jan. 25, 2007, which are hereby incorporated by reference in their entirety. International Application No. PCT/US2009/030118 filed Jan. 5, 2009, is further a continuation-in-part of International Application No. PCT/US2008/050501, filed Jan. 8, 2008, which is a continuation of U.S. patent application Ser. No. 11/626,869, filed Jan. 25, 2007, which are hereby incorporated by reference in their entirety. This application is a continuation-in-part of U.S. patent application Ser. No. 11/626,869, filed Jan. 25, 2007, which is hereby incorporated by reference in its entirety.

BACKGROUND

The present invention generally relates to conveyor systems.

Most warehouses and retail spaces only utilize a fraction of their available vertical space due to many factors, including the limited range to access items stored at higher levels. Three dimensional rack systems in the form of Automated Storage and Retrieval Systems (often referred to as ASRS or AS/RS) have been proposed that store items on vertical storage racks. However, these vertical systems have several significant commercial drawbacks. As one example, throughput is always a concern for these vertical systems because moving the additional vertical dimension can increase retrieval times. In other words, retrieving items from the racks in a quick and efficient manner has been a constraint in most proposed systems.

Thus, there is a need for improvement in this field.

SUMMARY

Inventors of the present invention previously developed a unique and inventive three-dimensional automated material handling system that is described in U.S. patent application Ser. No. 11/626,869, filed Jan. 25, 2007, and International Application No. PCT/US2008/50501, filed Jan. 8, 2008, which are hereby incorporated by reference in their entirety. In the systems described in these applications, a vertically moveable conveyor in the form of a cross-belt conveyor loads items into a centrally located series of bins or totes. In one variation of this system, a cross-belt conveyor system surrounds a vertical transport onto which the totes are loaded, and the cross-belt conveyor system is coupled to an elevator portion of the vertical transport so that the cross-belt conveyor system moves vertically in unison with the vertical transport. The cross-belt conveyor system includes a number of discrete conveyor belts that are able to individually or collectively convey items. The individual conveyor belt sections in the cross-belt conveyor system are able to move or rotate around the vertical transport. The cross-belt conveyor system allows multiple rack positions to be unloaded simultaneously as well as allows the totes to be filled simultaneously from two or more sides. While such a system allows items to be picked or placed at a rate that is up to 4 or 5 times that of a human operator with nearly 100% accuracy, there are circumstances, such as in manufacturing, distribution, warehousing and/or retail environments, that require significantly higher distribution or transit speeds.

The inventors of the present invention discovered that one significant bottleneck to throughput was the travel time of the vertical transport. Totes were not able to be unloaded from the vertical transport until the vertical transport reached an unloading level where the totes were transferred to another conveyor.

The inventors solved this problem of rapidly distributing items to or from a vertical storage rack system with a vertically moveable transport conveyor by replacing the totes with one or more vertical feed conveyors that vertically extend between the various rack levels so that items can be loaded and/or unloaded at any of the levels without the need for the vertically moveable transport to return to a loading/unloading level. This unique and inventive vertical rack system can be used to load and unload items from the racks as well as rearrange items in the racks. As will be appreciated, this system and technique allows items to be continuously moved in a vertical direction as well as sorts or merges the items at high speeds. In other words, this arrangement minimizes the vertical positioning of the vertically moveable transport conveyor, such as a cross-belt conveyor, before it can discharge (or load) items, thereby improving throughput.

In one embodiment, the vertical feed conveyors are in the form of one or more spiral-shaped conveyors around which the cross-belt conveyor is looped. The spiral shape of the spiral conveyors allows items to be loaded and/or unloaded continuously from the various vertical rack levels as well as provides a compact configuration. Items can be loaded or unloaded at the various levels from one or more sides of the spiral conveyor. For example, with the cross-belt conveyor looped around the spiral conveyors, items can be loaded simultaneously onto the spiral conveyors from two or more sides. In one form, the vertical incline of the spiral conveyor is held to zero (i.e., the conveyor is not inclined such that it is level) for an 180 degree or bigger arc to allow two merge points at opposite sides at the same vertical level, but this arc where the spiral conveyor is level can be different in other embodiments. In further variations, other types of conveyors can be used in place of the spiral and cross-belt conveyors.

This system also allows items to be rapidly transported to or from one or more discharge/supply locations, even when the rows of items in the vertical racks are not aligned (horizontally and/or vertically) with the discharge/supply locations. For example, the cross-belt conveyor can be used to laterally transport one or more items from one rack row that is not horizontally aligned with a spiral conveyor, and the spiral conveyor can be used to vertically transport the items up or down to a discharge location. At the discharge location, the items can be further processed. For instance, the items at the discharge location can be packaged, processed, sorted, palletized, loaded into a vehicle (e.g., a truck, van, car, train, ship, airplane, and/or the like), inspected, etc.

In addition, the vertical rack system allows items to be simultaneously loaded, unloaded, and rearranged in the racks, if so desired. For example, one of the spiral conveyors can be used to supply items to the cross-belt conveyor, which in turn loads items into a rack; while at the same time, the cross-belt conveyor discharges items onto another spiral conveyor. In another example, the cross-belt conveyor is used to transport or rearrange items between rows on the same level and/or rows on different levels, such as by moving vertically and/or via the spiral conveyors.

Another aspect concerns a unique system and technique for replenishing items on the racks. Although this system and technique will be described with reference to replenishing items on the racks, it can also be used to remove items from the racks and/or to rearrange items. For instance, this system can be used to supply items from the racks to two or more spiral conveyors. In the system, one or more vertically extending feed conveyors, such as spiral conveyors, transport items vertically to the various rack levels. At each vertical rack level, one or more conveyors are used to horizontally or laterally transport the items to the various storage rows on the particular level. It is contemplated that other types of conveyors can be used as well. Along these lateral conveyors, each level has a moveable pusher member that loads items into the particular rows. The pusher member is able to move horizontally along the conveyor to service the entire level or some section of the level, thereby reducing the number of pusher members needed. In a further variation, one or more pusher members are disposed along the spiral to direct items to a specific rack level. In one example, a single pusher member travels in a spiral fashion along the spiral conveyor so that it can service more than one vertical level and/or the entire spiral conveyor. In another example, each level has a pusher member.

Other aspects concern unique mechanisms and techniques for diverting items from the vertical feed conveyors in order to supply items to the various rack levels. In one embodiment, an angled roller belt on a spiral conveyor diverts items, and in another embodiment, a puller mechanism pulls items from the spiral conveyor. In still yet another embodiment, a shoe sorter on the spiral conveyor diverts items on the spiral conveyor.

As should be appreciated, the system and techniques described and illustrated herein can be utilized in numerous situations and environments including, but not limited to, warehousing, manufacturing, distribution, retail, and the like.

Further forms, objects, features, aspects, benefits, advantages, and embodiments of the present invention will become apparent from a detailed description and drawings provided herewith.

BRIEF DESCRIPTION OF THE DRAWINGS

FIG. 7 is a front view of a spiral conveyor system according to another embodiment.

FIG. 8 is a top, cross-sectional view of the FIG. 7 spiral conveyor system as taken along line 8-8 in FIG. 7.

DESCRIPTION OF SELECTED EMBODIMENTS

Figure 1:
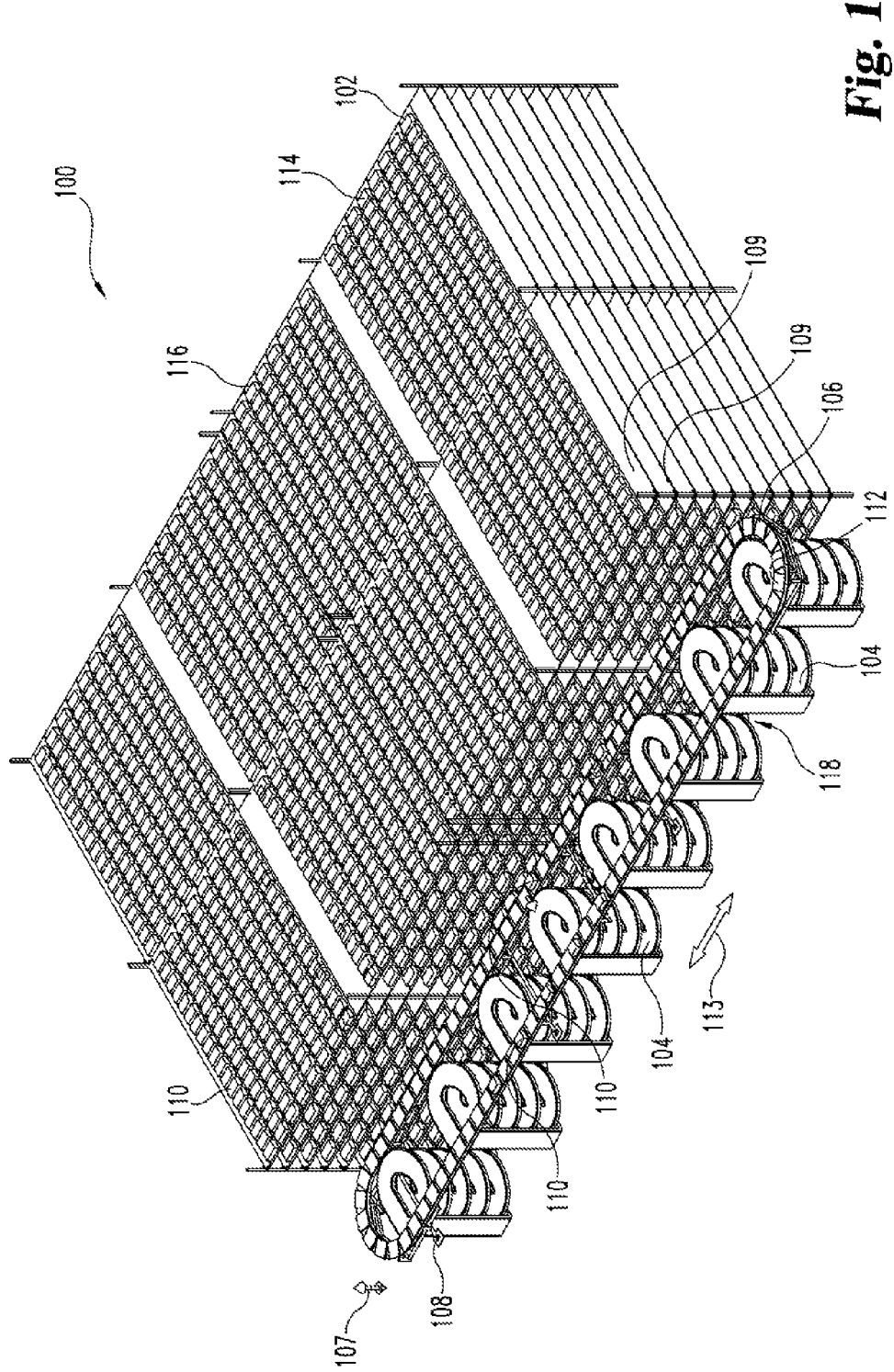
FIG. 1 is perspective view of a three-dimensional storage system according to one embodiment.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some common features that are not relevant to the present invention may not be shown for the sake of clarity.

For the convenience of the reader, it should be initially noted that the drawing in which an element is first introduced is typically indicated by the left-most digit(s) in the corresponding reference number. For example, a component identified with a one-hundred series reference number (e.g., 100, 101, 102, 103, etc.) will usually be first discussed with reference to FIG. 1, and a component with a two-hundred series reference number (e.g., 200, 201, 202, 203, etc.) will usually be first discussed with reference to FIG. 2.

Figure 2:
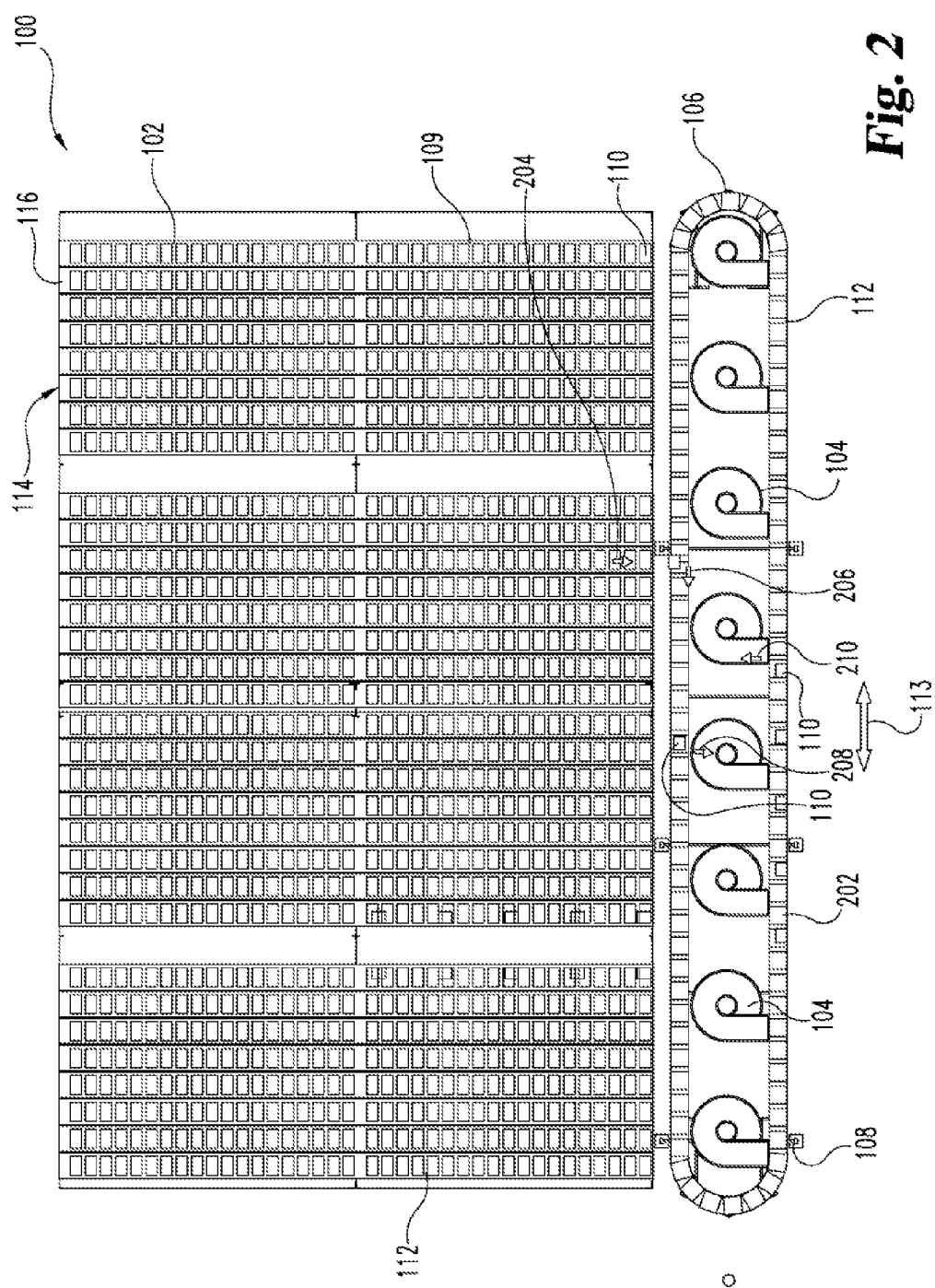
FIG. 2 is a top plan view of the FIG. 1 system.

A three-dimensional storage system 100 according to one embodiment (among many) of the present invention will be initially described with reference to FIGS. 1 and 2. As can be seen, FIG. 1 illustrates a perspective view of the system 100, and FIG. 2 shows a top plan view of the system 100. Looking at FIG. 1, the system 100 includes a series of conveyors in vertical racks 102 for storing products or other types of items. The system 100 further includes one or more vertical feed (in-feed/discharge) conveyors 104. At least a portion of a vertical transport conveyor 106 extends between the racks 102 and the vertical conveyors 104. As indicated by vertical direction arrow 107, an elevator type mechanism 108 vertically raises or lowers the vertical transport 106 to one or more levels 109 of the racks 102 where items 110, which are commonly called stock keeping units (SKUs), are stored. The vertical transport 106 includes a transport conveyor 112 that is able to move laterally relative to the racks 102 in either direction, as is indicated by double arrow 113. This ability of the transport conveyor 112 to move laterally (horizontally) allows the transport conveyor 112 to transport items 110 between the vertical feed conveyors 104 and rows 114 of items 110 on the racks 102 even when the vertical feed conveyors 104 and the rows 114 of items 110 are not aligned. In other words, this arrangement allows items 110 to be transported regardless of the relative location of the vertical feed conveyors 104 and the rows 114. As can be seen, the vertical feed conveyors 104 extend vertically such that the transport conveyor 106 is able to load and/or unload items 110 on numerous rack levels 109 without needing the vertical transport 106 to return to the bottom or some other loading/unloading level. With this arrangement, items 110 can be rapidly and continuously loaded, unloaded and/or rearranged on the racks 102. For additional information about the racks 102, transport conveyors 106, elevators 108, as well as other various features, please refer to U.S. patent application Ser. No. 11/626,869, filed Jan. 25, 2007 and International Application No. PCT/US2008/50501, filed Jan. 8, 2008, which are hereby incorporated by reference in their entirety.

In one example, the system 100 is used to rapidly supply items 110 to multiple locations. During operation, the elevator 108 raises or lowers the vertical transport 106 to various rack levels 109. Once the vertical transport 106 reaches a desired rack level 109, one or more items 110 from that particular level 109 are discharged from the racks 102 onto the transport conveyor 112. The transport conveyor 112 then moves the items 110 to one or more of the vertical feed conveyors 104, and the items 110 are then deposited onto the vertical feed conveyors 104. The vertical feed conveyors 104 move the items 110 to one or more desired discharge/supply or processing levels (or locations) 118 and/or to other systems for further processing. In this example, the discharge level 118 is located at the bottom of the vertical feed conveyors 104, but in other embodiments, the discharge level 118 can be located at the top or somewhere in between the top and bottom. At the discharge level 118, the items 110 can be further processed. For instance, the items 110 at the discharge level 118 can be packaged, sorted, palletized, loaded into a vehicle (e.g., a truck, car, train, ship, airplane, and/or the like), inspected, etc. Once the desired items 110 from the level 109 are retrieved, the elevator 108 raises or lowers the transport conveyor 112 to a different level 109 so that the items 110 on that level 109 can be loaded onto the vertical feed conveyors 104 in the same fashion as described above. It should be appreciated that this process can be reversed in order to replenish items 110 on the racks 102. For instance, items 110 can be supplied via the vertical feed conveyors 104, loaded onto the transport conveyors 112, and then loaded into the racks 102 on a particular level 109. Subsequently, the transport conveyor 112 is raised or lowered to replenish other levels 109.

The items or SKUs 110 on the racks 102 can include individual products or a collection of products grouped together, such as in a box. Each rack 102 has one or more vertical levels 109 on which the items 110 are stored. The various levels 109 can be evenly spaced or unevenly spaced. As can be seen, each level 109 has one or more rack conveyors 116 that are independently moveable with respect to one another. Although the rack conveyors 116 illustrated in the drawings are belt conveyors, it should be recognized that other types of conveyors can be used. like roller conveyors, etc. The rack conveyors 116 are generally flat or level with respect to the floor, but it is contemplated that the rack conveyors 116 can be slightly or significantly inclined, if so desired. Moreover, in other variations, the racks 102 may not include conveyors at all, but for example, include generally smooth sliding surfaces. Moreover, the items 110 in other embodiments can be arranged on the racks 102 in other manners (besides in rows). For example, the items 110 can be arranged in a staggered fashion on the racks 102. Although one set of racks 102 is shown, the system 100 in other embodiments can include two or more sets of racks 102. For example, the system 100 can include a series of racks 102 circumferentially spaced around the vertical transport 106. In another example, the racks 102 can be positioned on opposite sides of the vertical feed conveyors 104, and in still yet another example, one or more transport conveyors 112 along with the vertical feed conveyors 104 generally wrap around or surround the racks 102.

Looking at FIG. 2, the transport conveyor 112 is looped around the vertical feed conveyors 104. A second set of racks 102 can be located on the opposite side of the vertical transport 106 so that the looped configuration of transport conveyor 112 is able to load items 110 onto the vertical feed conveyors 104 from opposing sides. Each rack 102 can be serviced by more than one vertical transport 106. For example, the vertical transports 106 can be oriented in a side-by-side fashion, vertically stacked or offset from one another, and/or arranged in some other manner. When more than one is used, various vertical transports 104 can move vertically and/or horizontally independently of another and/or in unison. Likewise, various transport conveyors 112 can transport items 110 independently of one another and/or in unison.

The transport conveyor 112 in the illustrated embodiment is a cross-belt conveyor, but in other embodiments, other types of conveyors can be used like roller, bucket, chain, angled roller belt (ARB), and cart-on-track conveyors, to name just a few examples. In these other embodiments, various mechanisms, such as pusher mechanisms, puller mechanisms, shoes, etc., can be used to load and unload items 110 from the transport conveyor 112, if needed. The transport conveyor 112 is used to transfer items 110 from the storage racks 102 to the vertical feed conveyors 104 (or vice-versa). In the embodiment depicted in FIG. 2, the cross-belt conveyor includes individual carriages 202 linked together that are moveable along a carriage track or rail. In the illustrated embodiment, the carriages 202 are linked together to form a continuous, endless loop, but in other embodiments, a number of carriages 202 can be grouped together to form several trains that simultaneously run along the track in an asynchronous manner. For example, the cross-belt conveyor in another embodiment has two trains of carriages 202 located on opposite sides of the vertical feed conveyors 104. The two separate trains are configured to move independently of one another in order to speed processing. In still yet another embodiment, the transport conveyor 112 is not looped around the vertical feed conveyors 104, but instead, two parallel transport conveyors 112 extend in a linear fashion on opposite sides of the vertical feed conveyors 104. The system 100 in still yet another embodiment has a single transport conveyor 112 extending between oppositely facing racks 102, and the vertical feed conveyors 104 are offset and/or remotely located relative to the racks 102. For instance, the vertical feed conveyors 104 can be shifted over to one side (or both) such that the vertical feed conveyors 104 are not aligned with the rack conveyors 116.

Returning to FIG. 1, the vertical feed conveyors 104 in one embodiment extend vertically for the full height of the racks 102. In other embodiments, the vertical feed conveyors 104 can be shorter or taller than the racks 102. For example, the racks 102 in one variation can be located in a lower level or floor, such as a basement, and the vertical feed conveyors 104 are taller than the racks 102 so that items 110 can be delivered to and/or supplied from a level, such as a ground floor, that is located above the racks 102. The vertical feed conveyors 104 in another example extend below or beneath the racks 102 that are located in an upper floor or level so that items 110 can be delivered to and/or supplied from locations located below the racks 102. The system 100 in still another variation can include combinations of vertical feed conveyors 104 that extend above the racks 102, below the racks 102, and/or at the same general level of the racks 102. In further embodiments, the system 100 includes numerous combinations of vertical feed conveyors 104 that are the same size, taller, and/or shorter than the racks 102. For vertical feed conveyors 104 that do not extend for the full height of the racks 102, items 110 on the rack levels 109 above the vertical feed conveyors 104 can be lowered to the vertical feed conveyors 104 via the vertical transport 106. Items 110 not prone to damage can also be dropped from the higher levels.

In the illustrated embodiment, the vertical feed conveyors 104 in the illustrated embodiment are designed to load and/or unload from every rack level 109, but in other embodiments, the vertical feed conveyors 104 can be configured to load and/or unload items 110 from some other interval of rack levels 109. For example, the vertical feed conveyors 104 in other embodiments are configured to receive and/or supply items 110 from every other or every third rack level 109. It should be recognized that the vertical feed conveyors 104 can receive and/or supply items 110 at other level intervals. Moreover, the system 100 can include combinations of vertical feed conveyors 104 that service different rack levels 109. For instance, one or more of the vertical feed conveyors 104 can service the even rack levels 109 (i.e., second level, fourth level, etc.) and at least one other vertical feed conveyor 104 can service the odd rack levels 109 (i.e., first level, third level, etc.).

The vertical feed conveyors 104 in the system 100 depicted in FIGS. 1 and 2 are spiral-type conveyors. In one form, the vertical feed conveyors 104 are spiral conveyors of the type supplied by Ambaflex (Grand Prairie, Tex.) or Ryson International (Yorktown, Va.), for instance. In other embodiments, the vertical feed conveyors 104 can be configured and/or shaped differently. For example, instead of extending in a circular spiral, the vertical feed conveyors 104 in other embodiments extend in a rectangular (or even square) helical pattern. The spiral or helical shape of the vertical feed conveyors 104 provides a compact configuration for fitting inside the loop of the transport conveyor 112. The vertical feed conveyors 104, however, in other variations extend in other fashions, besides in a helical pattern. For instance, one or more of the vertical feed conveyors 104 are straight and extend in a slant-type fashion from the top to the bottom of the racks 102. In another example, the vertical feed conveyors 104 extend in a stair-step fashion. In this example, each horizontal step of the stair-stepped shape vertical feed conveyor 104 can provide a service location where items 110 can be loaded or unloaded from the transport conveyor 112. The vertical feed conveyors 104 can be powered or unpowered. The vertical feed conveyor 104 in another variation is an unpowered chute in which items 110 are slid, and in another example, the vertical feed conveyor 104 is a belt-type conveyor to move the items 110. Other variations and features of the vertical feed conveyors 104 will be described below with reference to FIGS. 3-5 and 7-14.

A technique for transporting items 110 with the system 100 will be described with reference to FIGS. 1 and 2. Although the technique will be described with reference to supplying items from the racks 102, the steps of this technique can be reserved such that items 110 can be loaded on the racks 102 with this technique. Moreover, as mentioned before, loading and unloading of items 110 on the racks 102 can occur simultaneously, if so desired. Looking at FIG. 2, the rack conveyors 116 discharge the required items 110 onto the carriages 202 of the transport conveyor 112, as is indicated by arrow 204. The item 110 is then moved laterally in the direction as indicated by arrow 206 to a destination vertical feed conveyor 104. Other items 110 are transported by moving the transport conveyor 112 in the opposite direction. Once the item 110 reaches the destination vertical feed conveyor 104, the item 110 is discharged from the carriage 202 and onto the vertical feed conveyor 104, as is shown by arrow 208. Arrows 208 and 210 in FIG. 2 show that items 110 can be simultaneously loaded onto the vertical feed conveyors 104 from two or more sides and in this case from both sides. The vertical feed conveyor 104 is then moved, either lowered or raised, to the desired discharge level 118 (FIG. 1) where the item 110 is further processed. In this particular example, the item 110 is lowered to the floor where the item is packed with other items 110 from the same vertical feed conveyor 104 and then shipped (via truck, car, train, airplane, etc.) or otherwise processed further. Additional items 110 from the same rack level 109 are transported to other vertical feed conveyors 104 in a similar fashion. It should be recognized that virtual streams of items 110 can be unloaded from the rack conveyors 116 and deposited onto various vertical feed conveyors 104, thereby providing high throughput. Once the items 110 from a particular rack level 109 are processed, the vertical transport 106 is then raised or lowered to the next rack level 109 to be serviced. The next rack level 109 can be one just above or below the previous rack level 109 or can be several levels 109 away. As soon as the vertical transport 106 reaches the next vertical rack level 109 to be serviced, the items 110 from that particular level 109 are loaded onto the various vertical feed conveyors 104 in the same fashion described above and delivered to their respective destinations.

This technique and system 100 minimizes the vertical positioning of the vertical transport before it can discharge or retrieve items 110, thereby improving throughput. In other words, the vertical transport 106 does not need to travel to a particular unloading level in order to fulfill orders. Rather, the vertical transport 106 can fulfill multiple orders simultaneously and on a continuous basis such that orders can be processed in an extremely fast and efficient manner. Each of the vertical feed conveyors 104 can be dedicated to service one or more particular orders. For example, one of the vertical feed conveyors 104 can be dedicated to fulfill an order of items 110 for one truck (or other vehicle), and another vertical feed conveyor 104 can be dedicated to fulfill the orders for a different truck (or vehicle). Multiple vertical feed conveyors 104 can be grouped together to service relatively large orders in a rapid fashion. As should be recognized, this technique is used in areas other than in distribution, warehousing, wholesales, and retail situations. For instance, this technique can be used to rapidly distribute parts to various manufacturing lines.

Figure 3:
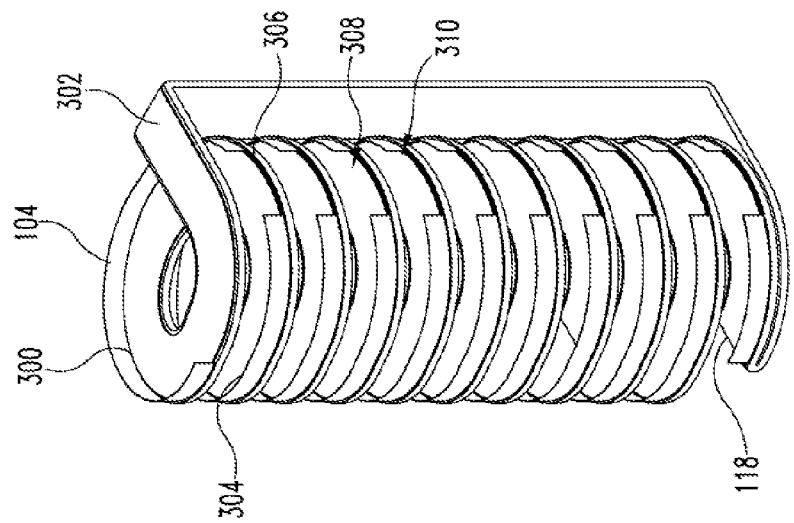
FIG. 3 is a perspective view of a spiral conveyor according to one embodiment that can be incorporated into the FIG. 1 system.
Figure 5:
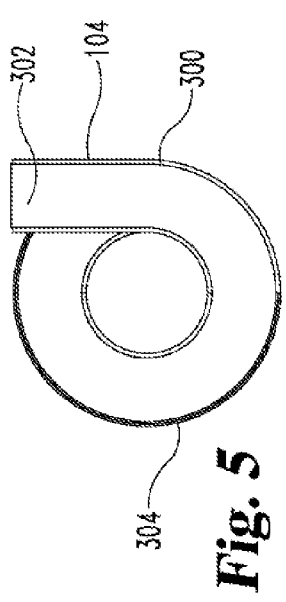
FIG. 5 is a top view of the FIG. 3 spiral conveyor.
Figure 4:
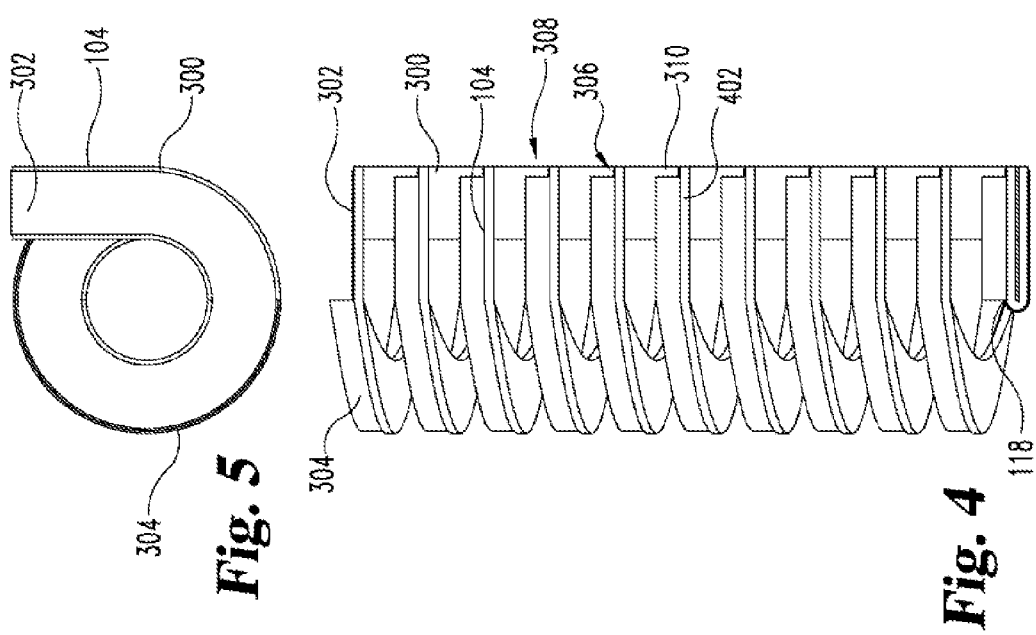
FIG. 4 is a front view of the FIG. 3 spiral conveyor.
Figure 6:
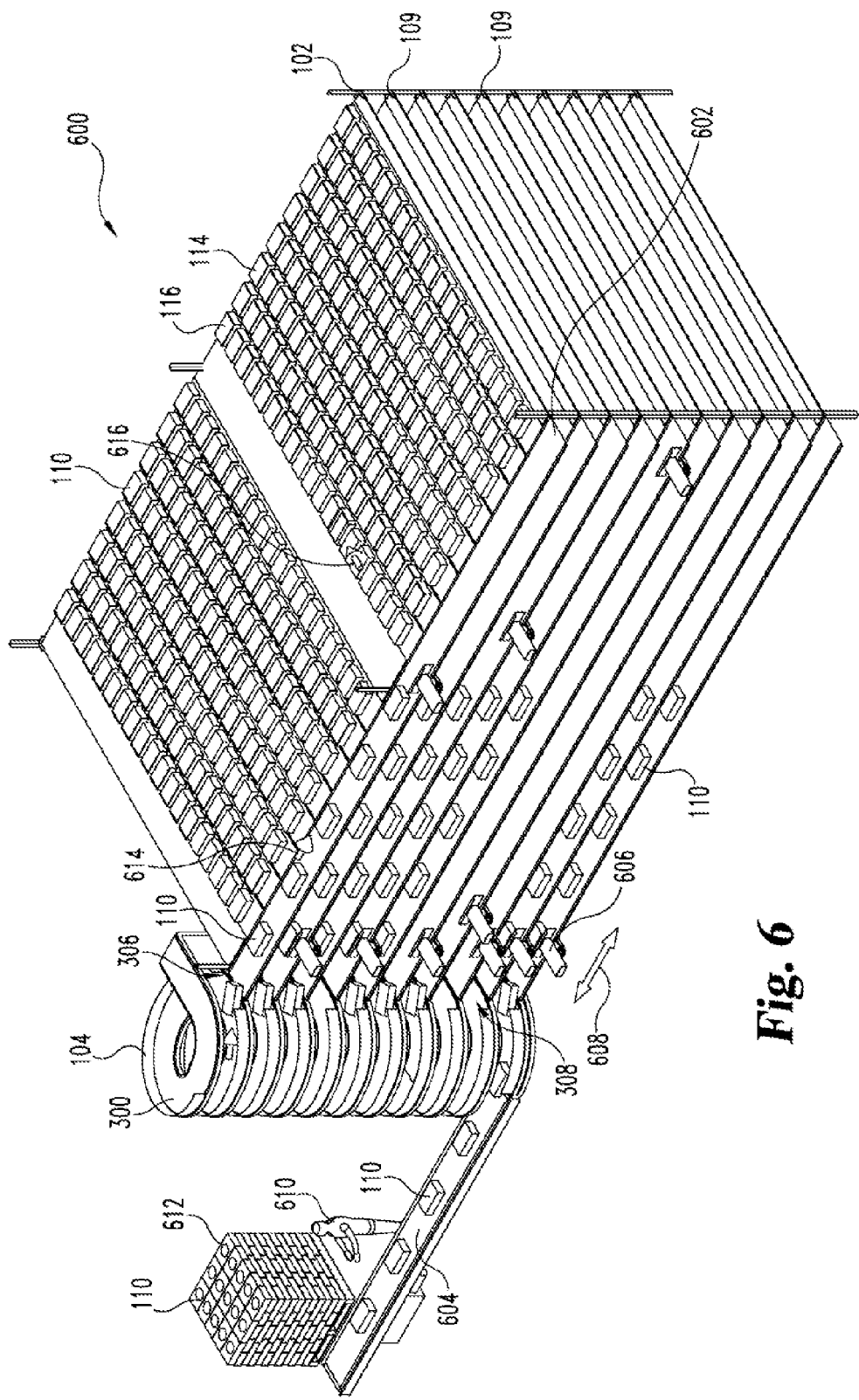
FIG. 6 is perspective view of a three-dimensional storage system according to another embodiment.

FIGS. 3, 4, and 5 illustrates an example of spiral conveyor 300 that can be used as vertical feed conveyor 104 for the systems illustrated in FIGS. 1 and 6. As can be seen, the spiral conveyor 300 includes a continuous conveyor belt 302 that generally is oriented in a spiral fashion. The spiral conveyor 300 includes a retention wall 304 that retains items 110 on the spiral conveyor 300. The spiral conveyor 300 further includes one or more loading/unloading levels 306 from which items 110 are loaded or unloaded from the spiral conveyor 300. In one form, the loading/unloading levels 306 generally correspond to the locations of the vertical rack levels 109 in the racks 102, but the levels 306 can be configured differently in other embodiments. The loading/unloading levels 306 of the spiral conveyor 300 can be positioned to service every other, second, third, fourth, etc. vertical rack levels 109 in the racks 102, for example. In the depicted embodiment, each loading/unloading level 306 of the spiral conveyor 300 has a loading/unloading section 308 where items 110 are loaded and/or unloaded. The loading/unloading section 308 in the illustrated embodiment are in the form of notches 310 in the retention walls 304 of the spiral conveyor 300, but the loading/unloading section 308 takes on other forms to facilitate transfer of items 110 in other embodiments. In the system 100 of FIG. 1, each loading/unloading level 306 has two loading/unloading sections 308 on opposite sides so as to facilitate loading and/or unloading from opposite sides, but in other embodiments, each level 306 can include one or more than two loading/unloading sections 308 (and even none). At the loading/unloading section 308, the spiral conveyor 302 in one embodiment is generally flat and level (not inclined) so that the items are loaded or unloaded on a level surface 402, as is shown in FIG. 4. This prevents tipping as well as jamming of items 110. In one form, the vertical incline of the spiral conveyor 300 is generally held to zero at the loading/unloading sections 308 (i.e., the conveyor 300 is not inclined such that it is level) for a 180 degree or bigger arc to allow two merge points at opposite sides at the same vertical level 306. However, this arc where the spiral conveyor 300 is level can be different in other embodiments. For example, the spiral conveyor 300 can be level for a 10 to 45 degree arc. In other examples, some or all of the loading/unloading levels 306 of the spiral conveyor 300 are not level but are inclined. Again, in further variations, other types of conveyors can be used in place of the spiral conveyor 300.

FIG. 6 illustrates a perspective view of a material handling system 600 that can be used in conjunction with or as an alternative to the system 100 of FIG. 1. For example, the system 600 of FIG. 6 can be used to load items 110 onto one end of the racks 102, and at the same time, the system 100 of FIG. 1 can be used to unload and distribute items 110 from the opposite end of the racks 102 (or vice-versa). Like the previous system 100, the system 600 in FIG. 6 has one or more vertical feed conveyors 104 and one or more racks 102. For the sake of brevity and clarity, the common features shared between the system 100 of FIG. 1 and the system 600 of FIG. 6 will not be discussed at length below, but please refer to the previous discussion of these features. Although only one vertical feed conveyor 104 is shown, the system 600 can include more than one. In the FIG. 6 embodiment, each vertical rack level 109 has a dedicated horizontal or lateral transport conveyor 602, and the system 600 has a spur conveyor 604 from which items 110 are loaded and/or unloaded from the vertical feed conveyor 104. As will be described below with reference to FIG. 15, the vertical rack levels 109 in other embodiments do not have dedicated lateral transport conveyors 602, but instead, one or more lateral transport conveyors 602 move vertically in a fashion similar to the vertical transport conveyor 106 in the system 100 of FIG. 1. The lateral transport conveyor 602 and spur 604 conveyors in one embodiment are belt conveyors, but the lateral transport conveyor 602 and spur 604 conveyors can include other types of conveyors, such as roller, cross-belt, bucket, chain, and cart-on-track conveyors, to name just a few examples. Each lateral transport conveyor 602 has one or more pusher members 606 that push items 110 from the lateral transport conveyors 602 onto the racks 102. The pusher members 606 are able to move horizontally or laterally, as is indicated by double arrow 608, so that a single pusher member 606 is able to service a section or the entire transport conveyor 602. This ability of the pusher member 606 to move reduces the number of required pusher members 606, which in turn reduces cost and simplifies maintenance. In other embodiments, each transport conveyor 602 has more than one pusher member 606, which can be used as a spare and/or used to service a section of the conveyor 602.

A technique for handling items with the system 600 of FIG. 6 will be described with reference to FIG. 6. Although the technique will be described with reference to supplying items 110 to the racks 102, this technique can be modified (e.g., reversed) to unload items 110 from the racks 102. Further, this technique can be modified to rearrange items on the racks 102. A worker 610 (or a robot) unloads items 110 from a pallet 612 and onto the spur conveyor 604. In the depicted embodiment, the items are loaded near the lower level of the racks 102, but it is contemplated that the items 110 can be loaded at other levels, such as above the racks 102, beneath the racks 102, and/or in the middle of the racks 102. From the spur conveyor 604, the items 110 travel vertically to a destination rack level 109 where the items 110 are transferred onto the corresponding lateral conveyor 602. The lateral conveyor 602 horizontally moves (arrow 614) the item 110 to the destination rack row 114. At the destination rack row 114, the pusher 606 pushes the item 110 in direction 616 onto the destination rack conveyor 116. Other items 110 can be loaded on other rows 114 and/or levels 109 in a similar fashion.

FIGS. 7 and 8 illustrate a diverter system 800 with a pusher member 606 that can be used to transfer items 110 from the vertical feed conveyor 104 to the lateral transport conveyor 602. The pusher member 606 in FIG. 8 includes a piston 802 that extends and retracts a pusher head 804 to push the item 110. In one embodiment, the pusher member 606 is fixed or otherwise associated to a specific level 306 of the spiral conveyor 300, and in another embodiment, the pusher member 606 is moveable such that the pusher member 606 is able to service multiple levels 306 of the spiral conveyor 300.

Figure 10:
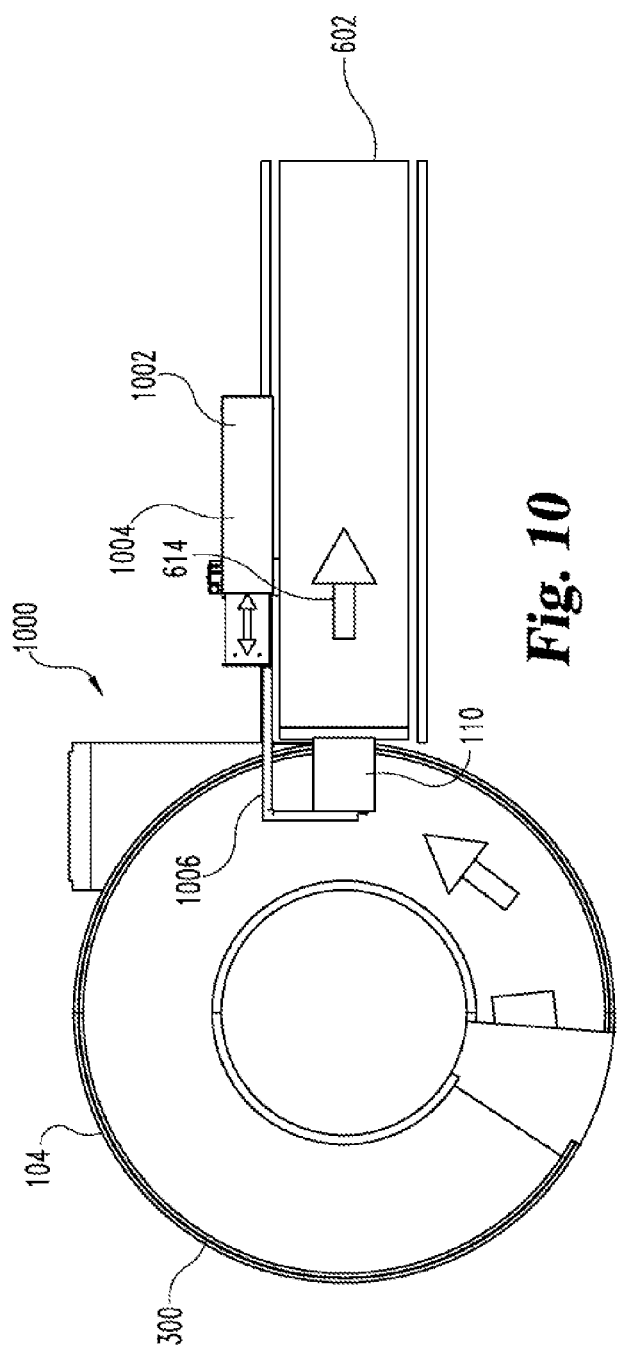
FIG. 10 is a top, cross-sectional view of the FIG. 9 spiral conveyor system as taken along line 10-10 in FIG. 9.
Figure 9:
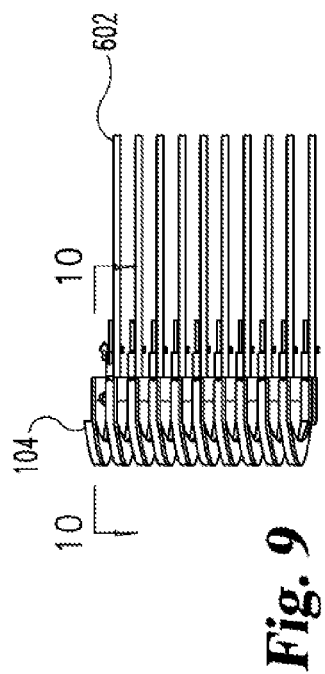
FIG. 9 is a front view of a spiral conveyor system according to a further embodiment.

FIGS. 9 and 10 show a diverter system 1000 with a puller mechanism 1002 that can be used to transfer items 110 from the vertical feed conveyor 104 to the lateral transport conveyor 602. As can be seen, the puller mechanism 1002 includes an actuator 1004 that extends and retracts a puller arm 1006. The puller arm 1006 in the illustrated embodiment is L-shaped, but it can be shaped differently in other embodiments.

Figure 12:
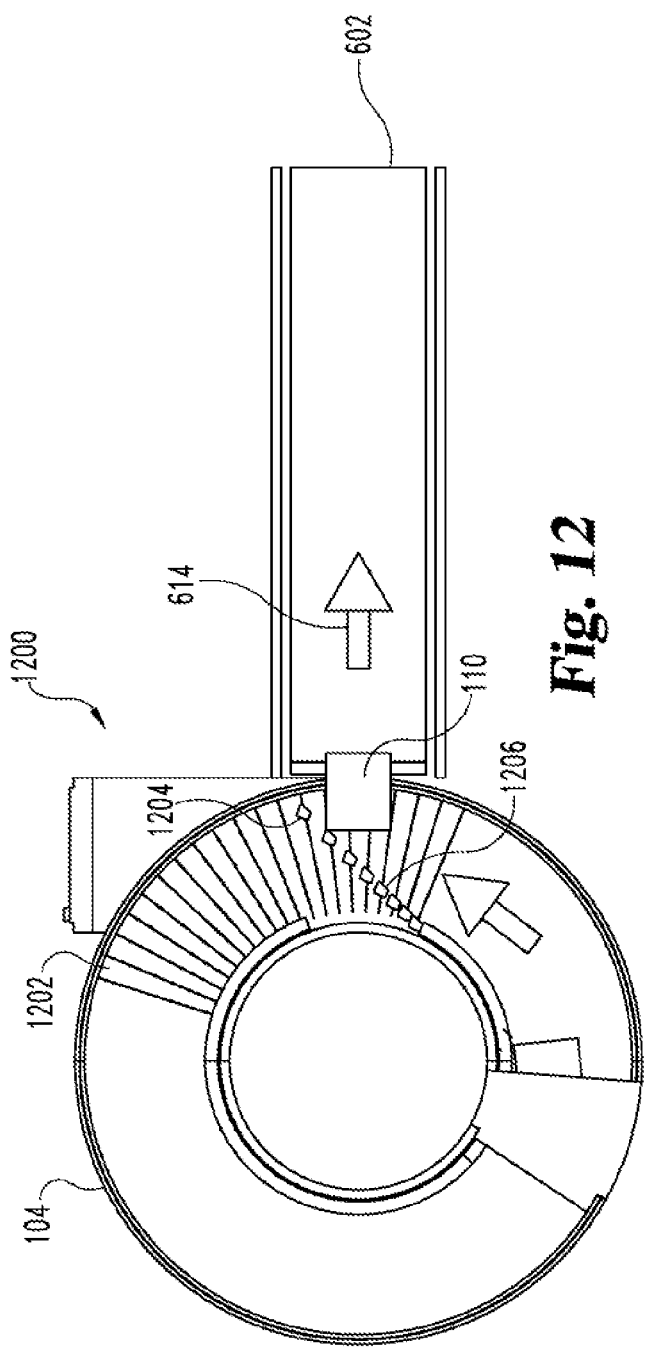
FIG. 12 is a top, cross-sectional view of the FIG. 11 spiral conveyor system as taken along line 12-12 in FIG. 11.
Figure 11:
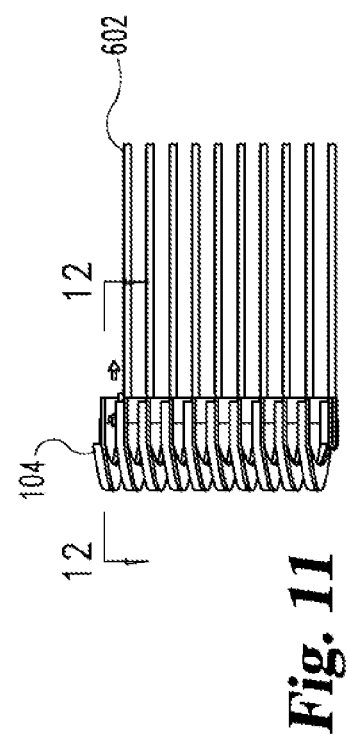
FIG. 11 is a front view of a spiral conveyor system according to still yet another embodiment.

FIGS. 11 and 12 depict a diverter system 1200 with a slat spiral conveyor 1202 and a shoe sorter mechanism 1204. Each shoe 1206 in the shoe sorter mechanism is capable of simultaneous independent lateral movement while it travels along the conveyor. As shown, the shoes 1206 move from one side of the spiral conveyor 1202 to the other, contacting the side of the item 110, thereby directing the item 110 to the lateral transport conveyor 602.

Figure 14:
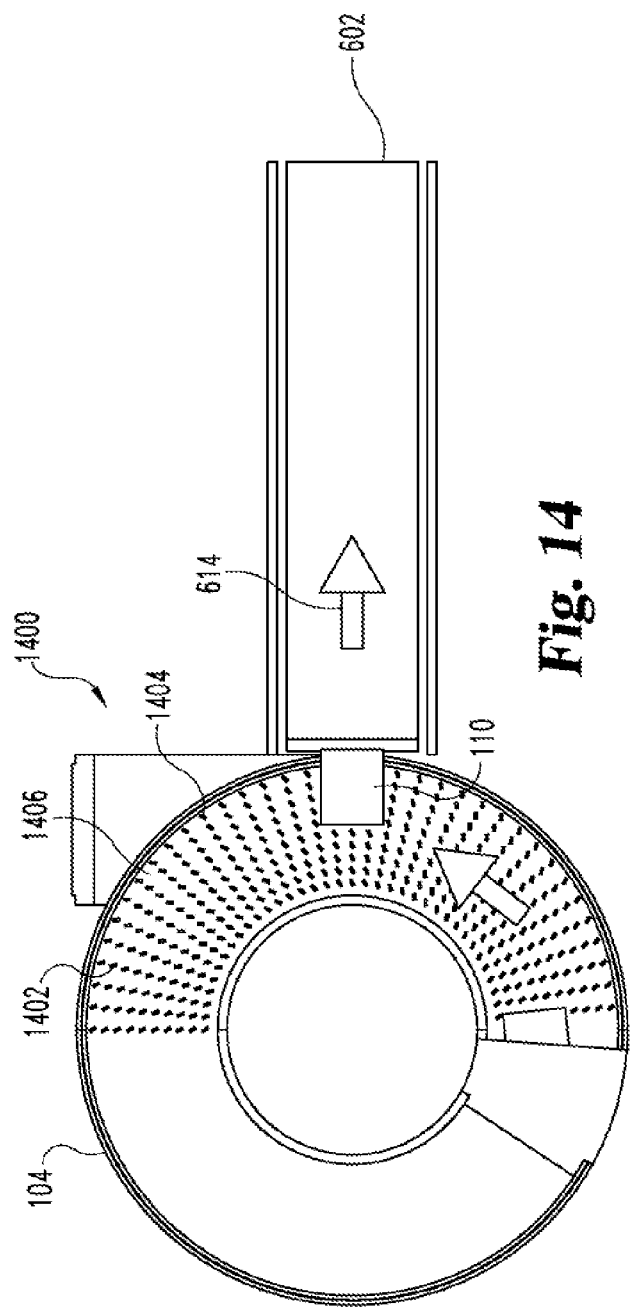
FIG. 14 is a top, cross-sectional view of the FIG. 13 spiral conveyor system as taken along line 14-14 in FIG. 13.
Figure 13:
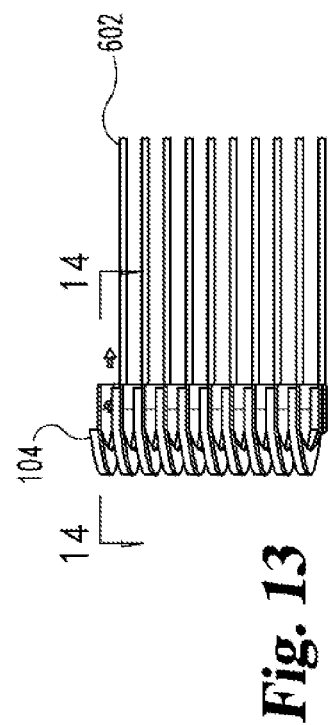
FIG. 13 is a front view of a spiral conveyor system according to another embodiment.

FIGS. 13 and 14 illustrate a diverter system 1400 with an activated or angled roller belt (ARB) 1402. ARBs 1402 typically have built-in rollers 1404 that are oriented at an angle relative to the travel direction of its belt 1406. The rollers 1404 are activated by pressing one or more rollers beneath the belt 1406 against the built-in rollers 1404. When the rollers 1404 in the belt 1406 are activated, the item 110 moves at an angle to the lateral transport conveyor 602. In one form, the ARB 1402 is of the type sold by Intralox, L.L.C. (Harahan, La.), but other types of ARBs can be used as well.

Figure 15:
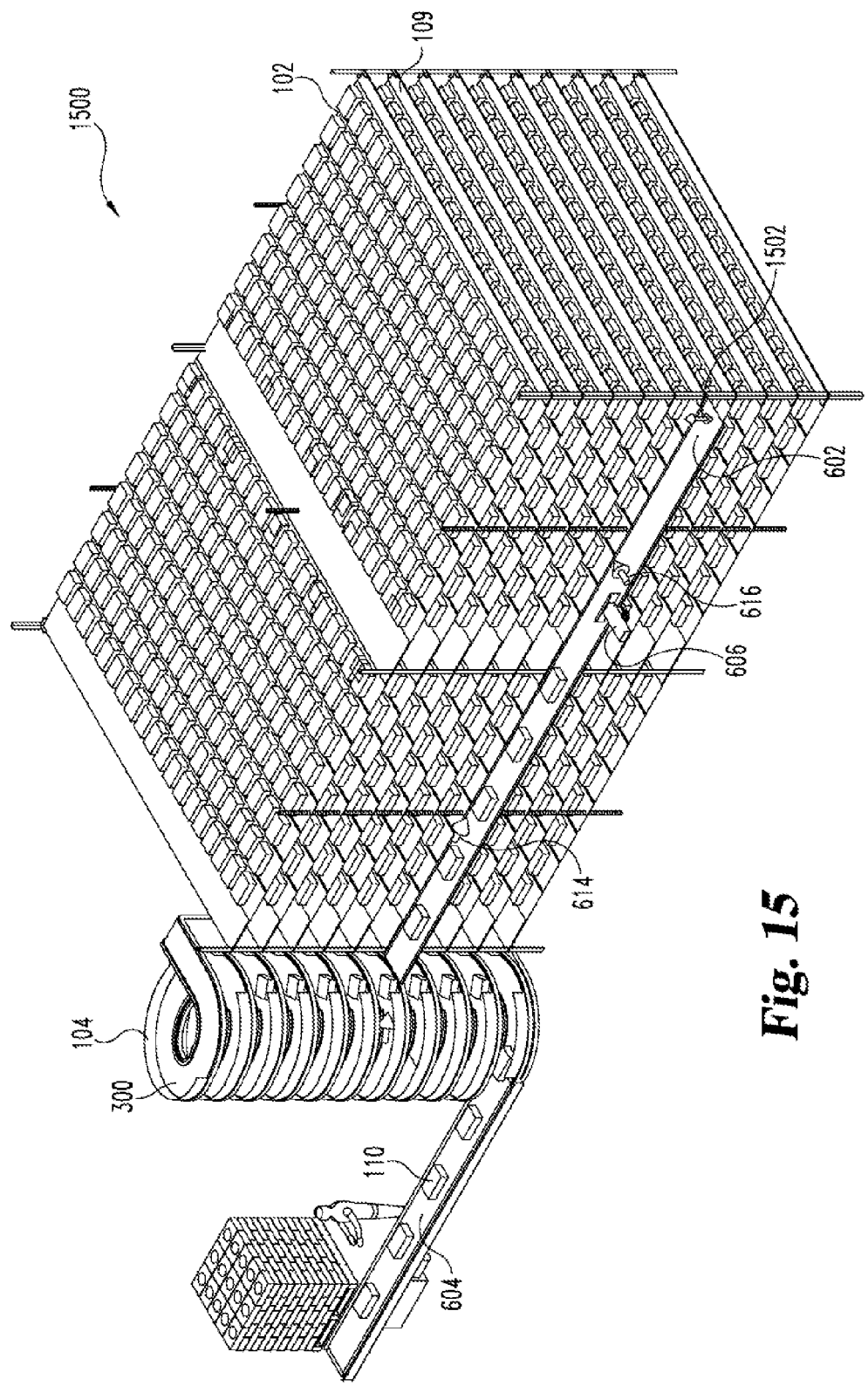
FIG. 15 is perspective view of a three-dimensional storage system according to still yet another embodiment.

FIG. 15 illustrates a perspective view of a material handling system 1500 that is a variation of the system 600 shown in FIG. 6. Most of the components in the FIG. 15 system 1500 are the same as the ones in the FIG. 6 system 600, with the exception that the lateral transport conveyor 602 is configured to move vertically. Like the previous system 600, the system 1500 in FIG. 15 has one or more vertical feed conveyors 104 and one or more racks 102. For the sake of brevity and clarity, the common features and functions shared between the system 600 of FIG. 6 and the system 1500 of FIG. 15 will not be discussed at length below, but please refer to the previous discussion of these features. As alluded to before, the vertical rack levels 109 do not have dedicated lateral transport conveyors 602. Instead, one or more lateral transport conveyors 602 move vertically, as indicated by arrow 1502, in a fashion similar to the vertical transport conveyor 106 in the system 100 of FIG. 1. An elevator 108 of the type described with reference to FIG. 1 can be used to raise and lower the lateral transport conveyor 602 in order to service the various rack levels.

As should be recognized, the above-described spiral conveyor systems of FIGS. 9-14 can be adapted for use with the system 100 of FIG. 1, the system 600 of FIG. 6, and/or the system 1500 of FIG. 15 as well as other types of material handling systems. Moreover, various components and features in the systems described above can be combined together and/or modified for use in other systems. The above-described techniques and systems can be used in numerous areas, such as distribution, warehousing, wholesales, retail, and manufacturing environments, to name just a few.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. A method, comprising:
   moving a cross-belt conveyor in a vertical direction to a storage level having an item, wherein the cross-belt conveyor includes one or more carriages moveable in a lateral direction and each of the one or more carriages having a powered belt mounted generally perpendicular to the lateral direction;
   moving the item with the cross-belt conveyor in a lateral direction relative to the storage level; and
   moving the item on a vertical conveyor to or from a vertical position that is vertically offset from the storage level while the cross-belt conveyor remains at the storage level.

2. The method according to claim 1, in which said moving the cross-belt conveyor in the vertical direction includes raising and/or lowering the cross-belt conveyor.

3. The method according to claim 1, in which:
   the storage level includes one or more storage rows; and
   said moving the item with the cross-belt conveyor in the lateral direction includes moving the item in a direction that is transverse and/or perpendicular to the storage rows.

4. The method according to claim 1, in which said moving the item on the vertical conveyor includes lowering and/or raising the item.

5. The method according to claim 1, further comprising:
   loading the item from the storage level onto the cross-belt conveyor after the cross-belt conveyor is moved to the storage level; and
   wherein said moving the item with the cross-belt conveyor in the lateral direction includes moving the item to a loading area of the cross-belt conveyor; and
   transferring the item from the cross-belt conveyor to the vertical conveyor.

6. The method of claim 5, further comprising:
   wherein said moving the cross-belt conveyor in the vertical direction includes raising the cross-belt conveyor to the storage level; and
   wherein said moving the item on the vertical conveyor includes lowering the item to an unloading area.

7. The method according to claim 1, further comprising:
   transferring the item from the vertical conveyor to the cross-belt conveyor;
   wherein said moving the item with the cross-belt conveyor in the lateral direction includes moving the item to a storage area of the storage level; and
   loading the item from the cross-belt conveyor onto the storage area of the storage level after the cross-belt conveyor is moved to the storage level.

8. The method according to claim 1, in which said moving the item on the vertical conveyor includes moving the item along a helical path.

9. The method according to claim 1, further comprising:
   moving the cross-belt conveyor in the vertical direction to a second storage level having a second item;
   moving the second item with the cross-belt conveyor in the lateral direction; and
   moving the second item vertically on the vertical conveyor.

10. The method according to claim 1, further comprising:
    moving a second item laterally to or from a second vertical conveyor with the cross-belt conveyor.

11. The method according to claim 1, further comprising:
    loading items on at least opposing sides of the vertical conveyor.

12. The method according to claim 1, in which the cross-belt conveyor moves vertically as well as horizontally to provide a continuous stream of items.

13. The method according to claim 1, in which the vertical conveyor extends vertically to provide a continuous vertical path.

14. The method according to claim 1, further comprising:
    pushing the item with a pusher that is laterally moveable along the cross-belt conveyor.

15. The method according to claim 1, further comprising:
    pushing the item with a pusher that is moveable along the vertical conveyor.

16. The method according to claim 1, in which the cross-belt conveyor includes a cross-belt conveyor looped around the vertical conveyor.

17. The method according to claim 1, in which the vertical conveyor includes a spiral conveyor that vertically transports the items on a continuous basis to and/or from a feed conveyor.

18. A system, comprising:
    at least one vertical storage rack having two or more rack levels;
    a cross-belt conveyor located along a side of the storage rack for transporting the items, the cross-belt conveyor including
       one or more carriages horizontally moveable in a travel direction along the one or more rack conveyors, and
       each of the one or more carriages having a powered belt mounted generally perpendicular to the travel direction to move the items generally perpendicular to the travel direction of the carriage;
    an elevator coupled to the cross-belt conveyor to move the cross-belt conveyor vertically between the levels of the storage rack; and
    one or more vertical feed conveyors that vertically extend between the various rack levels so that items can be loaded and/or unloaded at any of the levels without the need for the cross-belt conveyor to return to a loading/unloading level.

19. The system according to claim 18, in which the cross-belt conveyor is configured to laterally transport one or more items from one rack row that is not horizontally aligned with the vertical feed conveyors.

20. The system according to claim 19, in which the vertical feed conveyors are in the form of one or more helical-shaped conveyors.

21. The system according to claim 20, in which the cross-belt conveyor includes a cross-belt conveyor looped around the vertical feed conveyors.

22. The system according to claim 20, in which the vertical feed conveyors have one or more portions where the vertical feed conveyors are level.

23. The system according to claim 22, in which the portions where the vertical feed conveyors are level extend for at least an 180-degree arc to allow two merge points at opposite sides at the same vertical level.

24. The system according to claim 18, in which the cross-belt conveyor is configured to simultaneously load and/or unload the items onto the vertical feed conveyors from two or more sides.

25. The system according to claim 18, in which the vertical feed conveyors include:
   a first vertical feed conveyor configured to supply items to the cross-belt conveyor which in turn loads items into a rack; and
   a second vertical feed conveyor configured to receive items from the cross-belt conveyor.

26. The system according to claim 18, further comprising:
   one or more replenishment conveyors configured to transport the items to various storage rows on the rack level.

27. The system according to claim 26, in which each level has a moveable pusher member that loads items into the rows.

28. The system according to claim 27, in which the pusher member is able to move horizontally to service the entire level or some section of the level.

29. The system according to claim 18, in which one or more pusher members are disposed along the vertical feed conveyors to direct items to a specific rack level.

30. The system according to claim 18, in which a single pusher member travels in the vertical feed conveyor so that the pusher member can service more than one vertical level and/or the entire vertical feed conveyor.

31. The system of claim 18, in which the cross-belt conveyor includes a cross-belt conveyor.

32. The system of claim 31, in which the vertical feed conveyors are in the form of one or more helical-shaped conveyors around which the cross-belt conveyor is looped.

33. The system of claim 18, in which the vertical feed conveyors include a diverter system.

34. The system of claim 33, in which the diverter system includes a pusher member.

35. The system of claim 33, in which the diverter system includes a puller mechanism.

36. The system of claim 33, in which the diverter system includes a shoe sorter mechanism.

37. The system of claim 33, in which the diverter system includes an angled roller belt.

* * * * *